US008024805B2

(12) United States Patent
Masuoka et al.

(10) Patent No.: US 8,024,805 B2
(45) Date of Patent: Sep. 20, 2011

(54) METHOD AND EQUIPMENT FOR VERIFYING PROPRIETY OF SYSTEM MANAGEMENT POLICIES TO BE USED IN A COMPUTER SYSTEM

(75) Inventors: Yoshimasa Masuoka, Tokyo (JP);
Naoki Utsunomiya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1074 days.

(21) Appl. No.: 10/930,941

(22) Filed: Sep. 1, 2004

(65) Prior Publication Data

US 2005/0289272 A1 Dec. 29, 2005

(30) Foreign Application Priority Data

Jun. 24, 2004 (JP) ................................ 2004-186376

(51) Int. Cl.
*G06F 21/00* (2006.01)
(52) U.S. Cl. ........................................................ 726/25
(58) Field of Classification Search .................. 726/1, 25
See application file for complete search history.

(56) References Cited

U.S. PATENT DOCUMENTS

| | | | | |
|---|---|---|---|---|
| 5,778,390 | A | * | 7/1998 | Nelson et al. ................. 707/204 |
| 6,134,673 | A | * | 10/2000 | Chrabaszcz ..................... 714/13 |
| 6,504,621 | B1 | | 1/2003 | Salgado |
| 7,246,168 | B1 | * | 7/2007 | Bales ............................. 709/228 |
| 2003/0009696 | A1 | * | 1/2003 | Bunker et al. ................ 713/201 |

FOREIGN PATENT DOCUMENTS

| | | |
|---|---|---|
| JP | 2002-083136 | 3/2002 |
| JP | A-2002-082926 | 3/2002 |
| JP | 2003-228493 | 8/2003 |

OTHER PUBLICATIONS

Kikuma et al., "A Study of software test process for exchanger", Technical Report of the Institute of Electronics, Information and Communication Engineers, vol. 99, No. 402, pp. 13-18, SSE99-77, IEICE, Oct. 28, 1999.
U.S. Appl. No. 10/809,435, filed Mar. 26, 2004.

* cited by examiner

*Primary Examiner* — Gilberto Barron, Jr.
*Assistant Examiner* — Cordelia Zecher
(74) *Attorney, Agent, or Firm* — Anotnelli, Terry, Stout & Kraus, LLP.

(57) ABSTRACT

A policy verification method in an information processing system for verifying whether the policy rule operates correctly. The method verifies the policy in an information processing system including at least one component, using policies describing a series of system management operations to be performed when an event occurs, and automatically executing system management operations according to the policies when the event occurs. The method acquires configuration information on the component constituting the information processing system. The method acquires all the events that may occur in the information processing system from an event list stored in advance and the configuration information acquired, and generates them as a test item. The method executes the test item generated and verifying the propriety of the policy according to the result of the system management operations executed by the policy.

3 Claims, 13 Drawing Sheets

FIG. 3

MANAGEMENT OBJECT TABLE (300)

| OBJECT NAME | OBJECT TYPE | DETAILED INFORMATION | |
|---|---|---|---|
| (302A) | (303A) | (304A) | ~301A |
| "271A" | "STORAGE SERVER" | "PRODUCT NAME X" | ~301B |
| "282A" | "VOLUME" | "CAPACITY Y1" | ~301C |
| "282A'" | "VOLUME" | "CAPACITY Y2" | ~301D |
| "262A" | "JOB PROGRAM" | "PROGRAM NAME Z1" | ~301E |
| "262B" | "JOB PROGRAM" | "PROGRAM NAME Z2" | ~301F |
| "205" | "NETWORK" | "BAND WIDTH W" | ~301G |

FIG. 4

320 OPERATION MANAGEMENT TABLE

| OBJECT NAME | OPERATION NAME | AGENT ADDRESS (COMPUTER ADDRESS, PORT NUMBER) |
|---|---|---|
| 322A | 323A | 324A |
| "271A" | "REPLACEMENT" | AGENT ADDRESS OF SYSTEM MANAGEMENT AGENT 272B |
| 322B | 323B | 324B |
| "262A" | "STOP" | AGENT ADDRESS OF SYSTEM MANAGEMENT AGENT 261A |
| 322C | 323C | 324C |
| "262B" | "RE-START" | AGENT ADDRESS OF SYSTEM MANAGEMENT AGENT 261B |
| 322D | 323D | 324D |
| "262B" | "STOP" | AGENT ADDRESS OF SYSTEM MANAGEMENT AGENT 261B |
| 322E | 323E | 324E |

(rows labeled 321A, 321B, 321C, 321D, 321E)

FIG. 5

340 DEPENDENCY RELATIONSHIP TABLE

| OBJECT NAME | DEPENDENCY OBJECT NAME |
|---|---|
| (342A) | (343A) |
| "282A" | "271A" |
| (342B) | (343B) |
| "282A'" | "271A" |
| (342C) | (343C) |
| "262A" | "282A" |
| (342D) | (343D) |
| "262B" | "282A" |
| (342E) | (343E) |
| "262B" | "282'A'" |
| (342F) | (343F) |

Rows: 341A, 341B, 341C, 341D, 341E, 341F

FIG. 6

POLICY RULE TABLE (360)

| OBJECT NAME | EVENT NAME | SERIAL NUMBER | OPERATION OBJECT NAME | OPERATION NAME | ARGUMENT |
|---|---|---|---|---|---|
| 362A | 363A | 364A | 365A | 366A | 367A |

ROW 361A

| "271A" | "DOWN" | "1" | "271A" | "REPLACEMENT" | " " |
|---|---|---|---|---|---|
| 362B | 363B | 364B | 365B | 366B | 367B |

ROW 361B

| "271A" | "DOWN" | "2" | "DEPENDENCY SOURCE" | "REPLACEMENT" | " " |
|---|---|---|---|---|---|
| 362C | 363C | 364C | 365C | 366C | 367C |

ROW 361C

| "282A" | "REPLACEMENT" | "1" | "DEPENDENCY SOURCE" | "STORAGE REPLACEMENT" | " " |
|---|---|---|---|---|---|
| 362D | 363D | 364D | 365D | 366D | 367D |

ROW 361D

| "282A'" | "REPLACEMENT" | "1" | "DEPENDENCY SOURCE" | "STORAGE REPLACEMENT" | " " |
|---|---|---|---|---|---|
| 362E | 363E | 364E | 365E | 366E | 367E |

ROW 361E

| "262A" | "STORAGE REPLACEMENT" | "1" | "262A" | "RE-START" | " " |
|---|---|---|---|---|---|
| 362F | 363F | 364F | 365F | 366F | 367F |

ROW 361F

| "262B" | "STORAGE REPLACEMENT" | "1" | "262B" | "RE-START" | " " |
|---|---|---|---|---|---|
| 362G | 363G | 364G | 365G | 366G | 367G |

ROW 361G

| "262B" | "STORAGE DOWN" | "1" | "262B" | "STOP" | " " |
|---|---|---|---|---|---|
| 362H | 363H | 364H | 365H | 366H | 367H |

ROW 361H

| "262B" | "STORAGE DOWN" | "2" | " " | "NOTIFICATION" | "DOWN OCCURRED" |
|---|---|---|---|---|---|
| 362I | 363I | 364I | 365I | 366I | 367I |

ROW 361I

FIG. 7

TEST CASE LIST 380

| OBJECT TYPE | DEPENDENCY DESTINATION OBJECT TYPE | CASE NUMBER | SERIAL NUMBER | EVENT NAME | DISTRIBUTION DESTINATION FLAG |
|---|---|---|---|---|---|
| 382A | 383A | 384A | 385A | 386A | 387A |
| "VOLUME" | " " | "1" | "1" | "REPLACEMENT" | " " |
| 382B | 383B | 384B | 385B | 386B | 387B |
| "NETWORK" | " " | "1" | "1" | "DOWN" | " " |
| 382C | 383C | 384C | 385C | 386C | 387C |
| "STORAGE SERVER" | " " | "1" | "1" | "DOWN" | " " |
| 382D | 383D | 384D | 385D | 386D | 387D |

Rows: 381A, 381B, 381C, 381D

FIG. 11

TEST ITEM 400

| ITEM NUMBER | SERIAL NUMBER | OBJECT NAME | EVENT NAME | |
|---|---|---|---|---|
| 402A | 403A | 404A | 405A | ROW 401A |
| "1" | "1" | "282A" | "REPLACEMENT" | ROW 401B |
| 402B | 403B | 404B | 405B | |
| "2" | "1" | "282A'" | "REPLACEMENT" | ROW 401C |
| 402C | 403C | 404C | 405C | |
| "3" | "1" | "205" | "DOWN" | ROW 401D |
| 402D | 403D | 404D | 405D | |
| "4" | "1" | "271A" | "DOWN" | ROW 401E |
| 402E | 403E | 404E | 405E | |

FIG. 13

420 OPERATION HISTORY

| ITEM NUMBER | OPERATION TIME | OBJECT NAME | OPERATION NAME | ARGUMENT | |
|---|---|---|---|---|---|
| 422A | 423A | 424A | 425A | 426A | ← 421A |
| "1" | 12:10 | "262A" | "RE-START" | " " | ← 421B |
| 422B | 423B | 424B | 425B | 426B | |
| "2" | 12:15 | "282A" | "RE-START" | " " | ← 421C |
| 422C | 423C | 424C | 425C | 426C | |
| "3" | 12:21 | "262B" | "RE-START" | " " | ← 421D |
| 422E | 423E | 424E | 425E | 426E | |
| "4" | 12:22 | "262B" | "STOP" | " " | ← 421D |
| 422F | 423F | 424F | 425F | 426F | |

METHOD AND EQUIPMENT FOR VERIFYING PROPRIETY OF SYSTEM MANAGEMENT POLICIES TO BE USED IN A COMPUTER SYSTEM

CROSS-REFERENCE TO RELATED APPLICATION

This application is related to a U.S. application Ser. No. 10/809,435 filed Mar. 26, 2004, entitled "METHOD FOR GENERATING POLICY RULES AND METHOD FOR CONTROLLING JOBS USING THE POLICY RULES", the disclosure of which is hereby incorporated by reference.

INCORPORATION BY REFERENCE

The present application claims priority from Japanese application JP2004-186376 filed on Jun. 24, 2004, the content of which is hereby incorporated by reference into this application.

BACKGROUND OF THE INVENTION

The present invention relates to an information processing system and in particular, to an information processing system including a plurality of computers using a network. More specifically, when an event such as failure has occurred in the information processing system executing a job, the operation management processing (such as re-execution of the job being executed) for the event is automatically executed by using a policy rule, thereby verifying whether the policy rule operates correctly.

There is known a method using a policy rule for automatization of operation management of the information processing system. For example, there is known a method for applying a policy rule to each job in a policy manger contained in a job manager managing job execution and automatically executing an operation management in case an event such as failure has occurred during operation of the information processing system (for example, see U.S. Pat. No. 6,504,621).

According to the U.S. Pat. No. 6,504,621, a job manager for managing a job is arranged in the information processing system and this job manager includes a policy manager. When a user of the information processing system puts a job into the job manager, the user specifies "an action to be performed when an event has occurred during execution of the job as "a policy rule". Thus, the policy rule is applied to the policy manager. The event may be, for example, "abnormal job termination", "abnormal stop of device executing the job", and the like. Moreover, the action which can be specified may be for example, "re-execute the same job", "notify the user", and the like. When the policy manager detects an event of hardware failure of software failure in the information processing system, for example, when the policy manager detects an abnormal job termination, it references the policy rule and automatically performs the action described in the policy rule. Thus, when an event such as failure has occurred during job execution in the information processing system, an operation management work to cope with it is automatically executed.

On the other hand, there is also known a method associated with a test of an information processing system. For example, there is known a distributed application test/operation management system as follows. A quality measurement section for measuring the performance data in a component is embedded in the source code file groups of the distributed application, after which the source code file is introduced to a compiler. A server execution file required for starting/operating the server process is created and operated, and a quality data collection/analysis section collects performance data on the respective components from the quality measurement section. Moreover, normal operation data is collected from an application life cycle management section (for example, see JP-A-2002-082926).

The aforementioned background art has problems as follows.

Firstly, in the system disclosed in U.S. Pat. No. 6,504,621, if the content of the policy rule is incorrectly applied, execution of the processing described in the policy rule may generate a new problem. For example, when the policy rule "notify the user if a failure has occurred in the job" is applied, the user contact address may be incorrect. In this case, only after the failure has occurred in the information processing system being in process, it is found that the policy rule does not operate as is expected by the user. Moreover, when the failure has occurred, an appropriate operation management work cannot be performed. For the user, a greater loss is caused as compared to the case when no operation management work is automatically executed.

Secondly, the contents of policy rules applied to the information processing system may contradict to each other and when a particular event has occurred, another failure may occur. For example, there is a case that a policy rule "when a computer abnormally terminated, all the jobs being executed in the computer which has abnormally terminated are re-executed by an alternative computer" and a policy rule "when job X terminates abnormally, give up execution of job X and notify the user" are applied. In this case, if an event that the computer executing job X has abnormally terminated has occurred during execution of job X in the information processing system in operation, job X also terminates abnormally, and both of the policy rules are executed. As a result, in spite of the latter policy rule, the job X is re-executed by the former policy rule and there is a possibility that unintentional processing is performed such as data rewrite. Such a problem is easily caused when another policy rule is added to the information processing system in operation to which a policy rule has been already applied or when the policy rule applied is modified.

Thirdly, in general, instead of automatizing all the operation management works as policy rules, the information processing system is set in such a manner that in some cases a user (such as system administrator) of the information processing system manually executes the operation management work. When the information processing system is set in this way, the user should clearly grasp which events cause automatic execution of operation management work and which events require manual operation of the operation management work by the system administrator. There is a case, operation management work for an event is not automatized by a policy rule and the user is not prepared to manually execute the operation management work. In this case, the operation management work for the event may be delayed or may be incorrect and as a result, a great loss is caused for the user of the information processing system.

Fourthly, there is a limit on a test whether the policy rule operates as is expected by the user of the information processing system. For example, as is disclosed in JP-A-2002-082926, the test should be performed by using the information processing system itself which actually performs jobs. Unlike the performance measurement disclosed in JP-A-2002-082926, in general, when executing a test such as failure generation, it is necessary to stop the information processing system in operation. The system stop means temporary stop of the job being executed by using the information processing system and this is often not allowed.

SUMMARY OF THE INVENTION

It is therefore an object of the present invention to provide a method for testing in an information processing system whether a policy rule automatically executing operation management when an event such as failure has occurred is executed as is expected by the user of the information processing system.

A second object of the present invention is to provide a method for testing in an information processing system whether operation management by the policy rule is executed as is expected by the user of the information processing system when an event such as failure has occurred even if a plurality of policy rules are applied.

A third object of the present invention is to provide a policy rule test method capable of clarifying a case when no policy rule automatically executing the operation management is present and the user of the information system should execute the operation management work when an event such as failure has occurred.

A fourth object of the present invention is to provide a policy rule test method capable of executing the policy rule tests described in the first, the second, and the third object without stopping the information processing system.

In this invention, a test system is configured separately from an information processing system. The test system includes a policy manager equivalent to the information processing system. The user of the information processing system applies the same policy rule as the one applied to the information processing system to this policy manager.

Moreover, the test system includes a test tool for executing a test of a policy rule applied. The test tool acquires configuration information on the information processing system and lists up at least one-event which may actually occur in the information processing system according to the acquired configuration information and the test item list registered in advance. Furthermore, the test tool causes the events listed so that the events are detected by the policy manager. Since the policy manager is equivalent to the policy manager executed in the information processing system, as a result of event detection, the policy rule corresponding to the event is selected from the at least one policy manager applied and the system management operation described as an action is executed. The test tool records the system management operations executed by the policy manager as history information.

A user of the information processing system can know what kind of system management operation is performed as a result of execution of a policy rule for each of the events which may occur in the information processing system by referencing the history information on the test tool. Accordingly, the user of the information processing system can verify whether the policy rule applied to the information processing system operates as is expected by the him/her.

Moreover, the user of the information processing system can know which event does not cause automatic operation management work depending on the policy rule, by referencing the history information on the test tool. Accordingly, the user of the information processing system can add a policy rule for such events or judges to perform manual system management operations, thereby preparing for such events.

Furthermore, the test tool acquires configuration information on the information processing system so as to generate the same event as the event generated in the information processing system. The policy manager equivalent to the information processing system being executed on the test system detects an event generated and executes a policy rule. Accordingly, the user of the information processing system can use the test system so as to cause the policy manager to execute the same system management operation as generated in the information system in the test system. Thus, without stopping the information processing system, it is possible to record the test result in the history information.

According to the present invention, it is possible to test in the information processing system whether a policy rule automatically executing system management when an event such as failure has occurred is executed as is expected by the user of the information processing system.

Moreover, according to the present invention, it is possible to test in the information processing system whether a plurality of policy rules applied to automatically execute system management when an event such as failure has occurred are executed as is expected by the user of the information processing system.

Moreover, according to the present invention, the text can clarify the case when no policy rule is present for automatically executing system management when an event such as failure has occurred and the user of the information processing system should perform system management work by himself/herself.

Furthermore, according to the present invention, the aforementioned test can be executed without stopping the information processing system.

Other objects, features and advantages of the invention will become apparent from the following description of the embodiments of the invention taken in conjunction with the accompanying drawings.

BRIEF DESCRIPTION OF THE DRAWINGS

FIG. 3 explains an example of a management object table 300.

FIG. 4 explains an example of an operation management table 320.

FIG. 5 explains an example of dependency relationship table 340.

FIG. 6 explains an example of a policy rule table 360.

FIG. 7 explains an example of a test case list 380.

FIG. 11 explains an example of a test item 400.

FIG. 13 explains an example of an operation history 420.

DESCRIPTION OF THE EMBODIMENTS

Description will now be directed to embodiments of the present invention with reference to the attached drawings.

Embodiment 1

Firstly, explanation will be given on the first embodiment. This embodiments verifies (test) whether the policy rule applied to the information processing system shown in FIG. 1 operates as expected by the user of the information processing system by using the test system shown in FIG. 2 without stopping the information processing system.

Figure 1:
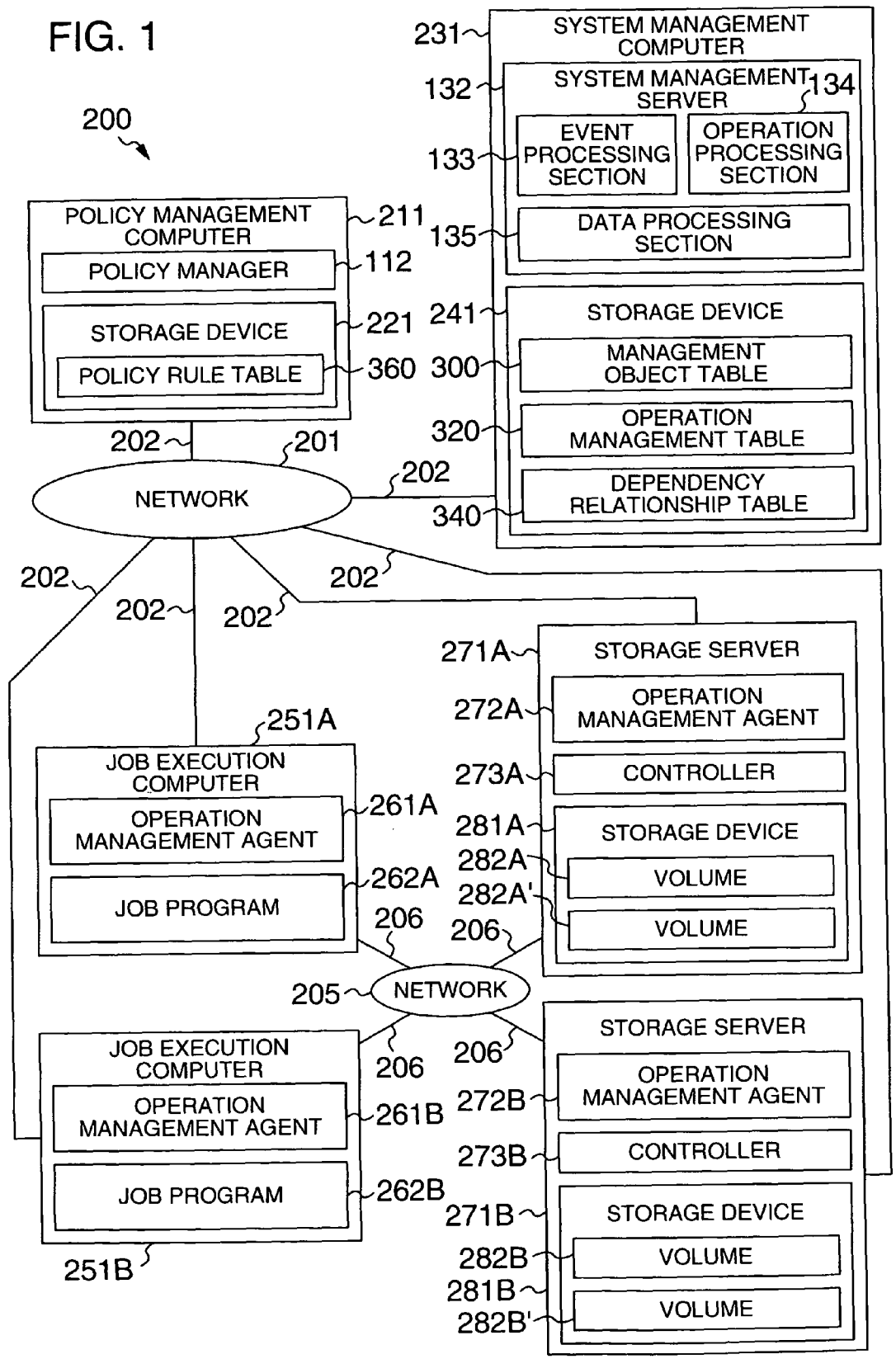
FIG. 1 is a block diagram showing configuration of an information processing system 200.

FIG. 1 a block diagram showing hardware configuration of the information processing system 200 according to the present embodiment.

In this embodiment, the user of the information processing system 200 performs processing required for performing a job by using the information processing system 200. Moreover, at least one policy rule is applied to the information processing system 200. The policy rule is description indicating what kind of processing is to be executed. For example, the policy rule describes that when an event of "failure" is caused, the system operation work to cope with the failure is automatically executed.

The information processing system 200 includes a policy management computer 211, a system management computer 231, job execution computers 251A, 251B, and storage servers 271A, 271B. These computers and servers are connected via a network 201. Moreover, the job execution computers 251A, 251B and the storage servers 271A, 271B are also connected via a network 205.

The policy management computer 211 is a computer capable of executing one or more programs. The policy management computer 211 includes a storage device 221 and executes a policy manager which is software. The storage device 221 holds the content of the policy rule applied to the information processing system 200. The policy management computer 211 is connected to the network 201 via a link 202. The policy manager 112 can transmit/receive a message via the link 202 to/from the other computers and the storage server 271 connected to the network 201. It should be noted that the storage device 221 and the policy manager 112 are controlled by a control device (not depicted).

The policy manager 112 manages the policy rule applied to the information processing system. More specifically, the policy manager 112 holds the policy rule applied to the information processing system 200 as a policy table 360 (which will be detailed with reference to FIG. 6). Moreover, when the event from the system management server 132 is transmitted as a message via the network 201, the message is received and the policy table 360 is searched so that the policy rule corresponding to the received event is acquired. The system management operation described in the policy rule is transmitted as a message to the system management server 132. The system management server 132 executes processing in accordance with the received message. For example, when a system information access request message is transmitted to the system management server 132, necessary system information is acquired.

The system management computer 231 is a computer capable of executing one or more programs. The system management computer 231 manages objects to be managed in the information processing system, i.e., operation states of the computers executing jobs (job execution computers 251A, 251B) and storage servers 271A, 271B as well as system information such as the job program being executed. The system management computer 231 includes a storage device 241 and executes the system management server 132 which is software. The storage device 241 is constituted by a memory, a hard disk or the like. The storage device 241 contains a management object table 300, an operation management table 320, and a dependency relationship table 340. The contents of these tables and processing using these tables will be detailed later. The system management computer 231 is connected to the network 201 via the link 202. The system management server 132 can transmit/receive a message via the link 202 to/from the other computers and the storage servers 271A, 271B connected to the network 201. It should be noted that the storage device 241 and the management system server 132 are controlled by a control device (not depicted).

The system management server 132 manages system information required for system management of the components of the information processing system 200 (hardware such as computers and storage devices, a job program, software such as system management servers, logical area such as a memory and a storage device, and the like). More specifically, the system management server 132 stores the information on the type of components constituting the information processing system 200 and dependency relationship between the components in the management object table (300) (which will be detailed with reference to FIG. 3), the operation management table 320 (which will be detailed with reference to FIG. 4), and the dependency relationship table 340 (which will be detailed with reference to FIG. 5) for management. The information on the type of components is, for example, "job program", "storage server", "volume", and the like. Moreover, the dependency relationship between the components is, for example, information indicating logical (or physical) dependency relationship such as "job program 262A uses volume 282A."

Moreover, the system management server 132 includes an event processing section 133, an operation processing section 134, and a data processing section 135. The system management server 132 receives a message via the network 201 from the policy manager 112, the system management agents 261A, 261B, and the system management agents 272A, 272B. If the received message is a system information access request, the data processing section 135 is called and search and update are executed to the management object table 300, the operation management table 320, or the dependency relationship table 340. Moreover, if the received message is an event message, the event processing section 133 is called. The event processing section 133 transfers the received event message to the policy manger 112. Moreover, if the received message is an execution request of the system management operations, the operation processing section 134 is called. The operation processing section 134 references the operation management table 320 and transfers the message to the system management agents 261A, 261B, the system management agents 272A, 272B according to the content of the received message.

The storage server 271 (271A, 271B) holds data used by the user of the information processing system 200 to execute a job. The storage server 271 includes a controller 273 (273A, 273B) and a storage device (281A, 281B) and a system management agent 272 (272A, 272B) is operating there. The storage server 271 is connected to the network via the link 206. The user of the information processing system 200 can access data stored in the storage devices 281A, 281B by communicating with the controllers 273A, 273B of the storage servers 271A, 271B via the network 205.

The system management agent 272 monitors the state of the storage server 271 and notifies an event to the system management computer 231. For example, if an event of failure has occurred in the storage device 281, a message is transmitted via the network 201 to the system management computer 231 to notify the occurrence of the event. Moreover, the system management agent 272 receives a message transmitted via the network 201 from the system management computer 231 and executes a system management operation execution request to the controller 272 according to the content of the message. The storage device 281A is constituted by one or more volumes. It should be noted that inn FIG. 2 only two volumes (282A, 282A' or 282B, 282B') are depicted.

The data accessed by user operation of the information processing system (such as processing of job program 262) is stored in one of the volumes 282. The respective volumes 282 are units of the system management of the storage device. The user transmits a message to the controller 273 for requesting system management operation in individual volume unit (for example, the capacity is increased and data is backed up in another volume).

It should be noted that in this embodiment, volume 282B functions as a backup of volume 282A. More specifically, the volume 282B has the same content as the volume 282A. If a failure occurs in the storage server 271A, a system management message indicating "replacement" is sent to the system management agent 272B via the network 201. The system management agent 272B which has received this message calls the controller 273B so that volume 282B can be used instead of volume 282A. On the other hand, volume 282B' can be used instead of volume 282A'. However, only the storage area instead of volume 282A' is provided and the content is not backed up.

It should be noted that the system management agent 272 may be hardware, a program executed in a computer arranged in the storage server 271, or a combination of hardware and a program. Moreover, the system management agent 272 may have a part of processing executed in a computer or device separately from the storage server. Moreover, the controller 272 may be hardware, a program executed in a computer arranged in the storage server 271 or a combination of hardware and a program.

The job execution computer 251 (251A, 251B) is a computer capable of executing one or more programs. The job execution computer 251 executes a job program 262 which is a program required for executing a job by a user of the information processing system 200 and the system management agent 261 for monitoring the state of the job execution computer. The job execution computer 251 is connected to the network 205 via the link 206. The programs executed in the job execution computer 251 can access the data stored in the storage devices 281A, 281B by communicating, via the link 206, with the controllers 273A, 273B of the storage servers 271A, 271B connected to the network 205. The system management agent 261 monitors the state of the job execution computer 251 and the job program 262 executed on the hob execution computer 251. When an event such as failure has occurred in these, a message is sent via the link 202 to the system management computer 231 connected to the network 201 so as to notify the event occurrence. It should be noted that the job program 262 and system management agent 261 are controlled by a control device (not depicted).

Moreover, the system management agent 261 receives the message sent via the network 201 from the system management computer 231 and requests the system management operation of the job program 262 (for example, the job program is stopped or resumed) according to the content of the message.

It should be noted that the system management agent 261 may be hardware, a program executed on the job execution computer 251, or a combination of hardware and the program. Moreover, the system management agent 261 may have a part of processing executed in a computer separately from the job execution computer 251. Moreover, the system management agent 261 may be divided into a portion for executing the system management of the job execution computer 251 and a portion of executing the system management of the job program 262.

The job program 262 (262A, 262B) executes processing required for the user of the information processing system 200 to execute a job. Moreover, the job program 262A uses the data stored in the storage server 271 by accessing it via the network 205 for executing processing.

It should be noted in this embodiment, the job program 262A uses the volume 282A of the storage server 271A. Moreover, the job program 262B uses the volumes 282A and 282A'. Use of the volume 282 by the job program 262 is realized by sending a data access message to the network 205.

The network 201 connects the policy management computer 211, the system management computer 231, the job execution computers 251A, 251B, and the storage servers 271A, 271B via the link 202. These computers and storage servers can communicate by message transmission/reception via the network 201. The network 201 is mainly used for performing communication for the system management work such as transmission/reception of a message notifying an event occurrence and a message requesting execution of the system management operation. It should be noted that the network link 201 and link 202 may have arbitrary detailed hardware specification (for example, whether to include a radio communication method, what kind of network devices are to be included, a broadband network or not). Although not depicted, the network 201 may be connected to other computers and other storage servers via a link similar to the link 202. Moreover, the link 202 may be of different types according to the computer and the server devices.

The network 205 connects the job execution computers 251A, 251B and the storage servers 271A, 271B via the link 206. These computers and storage servers can communicate by message transmission/reception via the network 205. The network 205 is used for executing communication required when the user of the information processing system 200 performs a job. That is, a message transmission/reception is performed when the job programs 262A, 262B respectively executed on the job execution computers 251A, 251B request read out and update of data stored in the storage devices 281A, 281B of the storage servers 271A, 271B. It should be noted that the network 205 and the link 206 may have arbitrary detailed hardware specification (for example, whether to include a radio communication method, what kind of network devices are to be included, broadband network or not). Moreover, although not depicted, the network 205 may be connected to other computers and storage servers by a link similar to the link 206. Moreover, the link 206 may be of different types according to the computers and storage servers.

It should be noted that the policy management computer 211 may have arbitrary hardware specification such as the type and number of processors or the number of casings (or enclosures) if it can execute the policy manger 112. Moreover, the storage device 221 may have arbitrary detailed hardware specification such as the type and number of storage devices if it can access the data stored in the storage device 221. Moreover, the storage device 221 need not be contained in the same casing as the policy management computer 211.

Moreover, system management computer 231 may have arbitrary detailed hardware specification such as the type and number of processors or the number of casings if it can execute the system management server 132. Moreover, the storage device 241 may have arbitrary detailed hardware specification such as the type and number of storage devices if it can access the data stored in the storage device 241.

Similarly, the job execution computer and the storage server 271 may have arbitrary detailed hardware specification such as the type and number of processors and the number of casings.

Moreover, in FIG. 1, the storage device 221, the storage device 241, the storage device 281A and the storage device 281B are depicted as separate storage devices but these devices may be partially or entirely contained in the same casing. For example, the storage device 221 and the storage device 241 may be composed of the same storage device as the storage device 281A of the storage server 271A and the data stored in the storage device 221 and the storage device 241 (such as policy rule table 360) may be entirely stored in the volume 282A (or other volume) of the storage device 281A.

Moreover, the network 201 and the network 205 may be the same network.

It should be noted that this embodiment is also satisfied when the respective components of the information processing system 200 explained as hardware configuration are not mounted as hardware. For example, there is no problem in this embodiment even if each computer of the information processing system 200 is virtually mounted as a computer by software in another computer.

Figure 2:
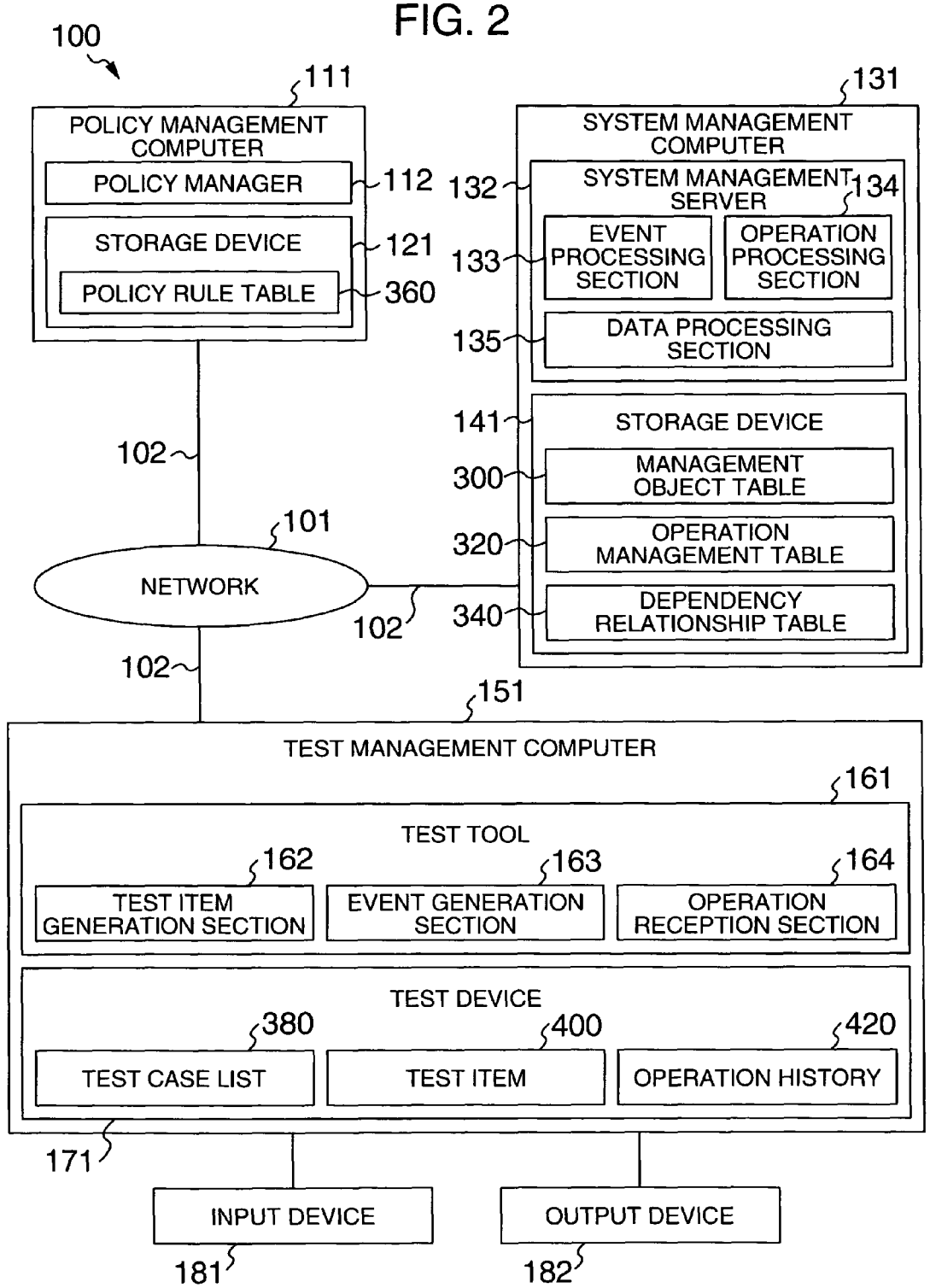
FIG. 2 is a block diagram showing configuration of a test system 100.

FIG. 2 is a block diagram showing hardware configuration of the test system 100 in this embodiment.

The test system 100 is a system verifying (testing) whether the processing in accordance with the policy rule of the information processing system 200 of the aforementioned FIG. 1 is correctly executed. The test system 100 of FIG. 2 includes a policy management computer 111, a system management computer 131, a test management computer 151, a network 101, and a link 102.

The policy management computer 111, the system management computer 131, the network 101, and the link 102 have the configuration and function equivalent to the policy management computer 211, the system management computer 231, the network 201, and the link 202 in the aforementioned information processing system 200 (FIG. 1). It should be noted that the policy management computer 111, the system management computer 131, the network 101, and the link 102 may be the same as the policy management computer 211, the system management computer 231, the network 201, and the link 202 in the aforementioned information processing system 200 (FIG. 1). That is, it is possible to constitute a separate system equivalent to the information processing system 200 of FIG. 1 for use in the test or it is possible to constitute the information processing system 200 of FIG. 1 itself so as to be used for the test.

The policy manager 112 of FIG. 2 is the same as the policy manager 112 of the information processing system 200 (FIG. 1). In order to make the policy manger 112 of the test system 100 identical to the policy manger 112 of the information processing system 200, there is a method for installing the same program as the policy manger 1121 of the information processing system 200 in the policy management computer 111 of the test system 100 or a method for moving the policy management computer 211 of the information processing system 200 to a place where the test system 100 is operating and connecting it as the policy management computer 111 to the network 101.

The test management computer 151 is a computer capable of executing one or more programs. The test management computer 151 includes a storage device 171 and executes a test tool 161 which is software. The test management computer 151 is connected to the network 101 via the link 102. The test tool 161 can transmit/receive a message to/from a computer connected to the network 101. Moreover, the test management computer 151 includes an input device 181 and an output device 182. The input device 181 includes a keyboard, a mouse, and the like for receiving input by the user. The output device includes a CRT display, a printer, and the like for displaying data and processing result to the user. The user can access the data stored in the storage device 171 by the input device 181 and the output device 182. It should be noted that in FIG. 2, only one input device 181 and one output device 182 are depicted. However, these may include two or more, or one of them may not be connected. It should be noted that the storage device 171 and the test tool 161 are controlled by a control device (not depicted).

The test tool 161 transmits an event message to the policy manager 112 via the system management server 132 being executed in the test management computer 151 and receives to record a system management operation message from the policy manger 132, thereby executing the policy test applied to the information processing system in the test system 100. The test tool 161 includes a test item generation section 162, an event generation section 163, and an operation reception section 164.

In the test tool 161, the policy rule test is executed as follows. Firstly, the test tool 161 calls the test item generation section 162, references a test case list 380 (which will be detailed later with reference to FIG. 7) containing events which may be generated for the respective components, and creates a test item for the policy rule test. The test item created is stored in the test item 400 (which will be detailed later with reference to FIG. 11). Next, the test tool 161 calls the event generation section 163, references the test item 400, and transmits an event message to the system management server 132. The event message transmitted to the system management server 132 is transferred from the system management server 132 to the policy manager 112. The policy manager which has received the event message references the policy rule and transmits a system management operation request corresponding to the event to the system management server 132 which is the message transmission source. The test tool 161 calls the operation reception section 164 and receives a system management operation request message from the system management server 132. The message received is stored in the operation history 420 (which will be detailed later with reference to FIG. 13).

It should be noted that the test management computer 151 may have arbitrary detailed hardware specification such as the type and number of processors and the number of casings if it can execute the test tool 161. Moreover, the storage device 171 may have arbitrary detailed hardware specification such as the type and number of storage devices if the test tool 161 can access the data stored in the storage device 171. Moreover, the input device 171 and the output device 182 may have such a configuration that they are connected to the test management computer 151 via the network 101 and the user can access the data stored in the storage device 171 by communication via the network 101.

FIG. 3 explains an example of the management object table 300.

The management object table 300 is a table structure consisting of at least one "row" as an entry. One "row" of the management object table 300 has the structure shown in 301A and is correlated to one of the components (job program, volume, storage server, and the like) which becomes a system management object in the information processing system 200. This "row" holds information associated with the component and includes an object name 302A, an object type 303A, and detailed information 304A. The object name 302A contains the name of the component corresponding to the row. The object name 302A stored is a unique name for the component of the information processing system 200. The object type 303A contains the type of the component corresponding to the row (such as "job program", "storage server", and the like). The detailed information 304A contains detailed information on the component corresponding to the row. The user of the information processing system 200 can know to which component of the information processing system 200 the component of the row corresponds, by referencing the content of the detailed information 304A by using the input device 181 and the output device 182.

Next, explanation will be given on an example of the specific content of the management object table 300 shown in FIG. 3.

The row 301B corresponds to "the storage server 271A". The object name 302B contains "271A", the object type 303B contains "the storage server", and the detailed information 304B contains "product name X" as the product name of the storage server.

The row 301C corresponds to "the volume 282A". The object name 302C contains "282A", the object type 303C contains "the volume", and the detailed information 304C contains "capacity Y1" as the capacity of the volume 828A.

The row 301D corresponds to "the volume 282A'". The object name 302D contains "282A'", the object type 303D contains "the volume", and the detailed information 304D contains "capacity Y2" as the capacity of the volume 828A'.

The row 301E corresponds to "the job program 262A". The object name 302E contains "262A", the object type 303E contains "the job program", and the detailed information 304E contains "the program name Z1" as the program name of the job program 262A.

The row 301F corresponds to "the job program 2628". The object name 302F contains "2628", the object type 303F contains "the job program", and the detailed information 304F contains "the program name Z2" as the program name of the job program 262A.

The row 301G corresponds to "the network 205". The object name 302G contains "205", the object type 303G contains "the network", and the detailed information 304G contains "the band width W" as the performance information on the network 205.

It should be noted that the contents of the management object table 300 are input by the user of the information processing system 200. Alternatively, a system management agent 261A, 261B or a system management agent 271A, 271B may transmit their configuration information as a message to the system management server 132 so that the system management server 132 can create the contents according to the message received.

FIG. 4 explains an example of the operation management table 320.

The operation management table 320 is a table structure consisting of at least one "row" as an entry. One "row" of the operation management table 300 has the structure shown in 321A and is correlated to one of the system management operations of a particular component ("replacement", "stop", "re-start", and the like) which becomes a system management object in the information processing system 200. This "row" include an object name 322A, an operation name 323A, and an agent address 324A. The object name 322A contains the name of the component corresponding to the row. The object name 322A contains the same name as one of the object names 302A, 302B, . . . of the management object table 300 corresponding to the component. The operation name 323A contains the system management operation of the component the row corresponding to the row. The agent address 324A contains an operation address of the system management agent executing the system management operation corresponding to the row. This address is information equivalent to "the destination" when transmitting a message via the network 201 and includes the computer address and the port number in this embodiment.

The system management server 132 which has received a message of the system management operation request acquires from the message, the object name of the object component for which the system management operation is executed and the operation name of the requested system management operation. The operation management table 320 is searched, the row corresponding to the object name and the operation name is acquired, and the agent address contained in the row is acquired. By using the acquired agent address, the message of the system management operation request is transmitted via the network 201. The destination of the message, i.e., the system management agent (system management agent 261A, 261B or system management agent 272A, 272B) receives the message and executes the system management operation.

Next, explanation will be given on an example of the specific content of the operation management table 320 shown in FIG. 4.

The row 321B corresponds to the system management operation for replacing the storage server 271A with the storage server 271B. The object name 322B contains the object name "271A" corresponding to the object server 271A, the operation name 323B contains "the alteration" as the operation name, and agent address 324B contains the agent address of the system management agent 272B as the message destination requesting the replacement.

The row 321C corresponds to the system management operation for stopping the job program 262A being executed. The object name 322C contains the object name "262A" corresponding to the job program 262A, the operation name 323C contains "the stop" as the operation name, and the agent address 324C contains the agent address of the system management agent 261A as the message destination requesting the stop.

The row 321D corresponds to the system management operation for re-starting the job program 262B being executed. The object name 322D contains the object name "262B" corresponding to the job program 262B, the operation name 323D contains "the re-start" as the operation name, and the agent address 324D contains the agent address of the system management agent 261B as the message destination requesting the re-start.

The row 321E corresponds to the system management operation for stopping the job program 262B being executed. The object name 322E contains the object name "262B" corresponding to the job program 262B, the operation name 323E contains "the stop" as the operation name, and the agent address 324E contains the agent address of the system management agent 261B as the message destination requesting the stop.

It should be noted that the contents of this operation management table 320 are input by the user of the information processing system 200. Alternatively, a system management agent 261A, 261B or a system management agent 271A, 271B may transmit their system management operation information as a message to the system management server 132 so that the system management server 132 can create the contents according to the message received.

FIG. 5 explains an example of the dependency relationship table 340. The dependency relationship table 340 is a table structure consisting of at least one "row" as an entry. One "row" of the dependency relationship table 300 has the structure shown in 341A and contains information indicating that a component is dependent of another component. This "row" includes the object name 342A and the dependency object name 343A. The object name 342A contains the same name as the object name of the management object table 300 corresponding to this row. The object name 343A contains the name of another component on which the component corresponding to this row is dependent. The object name 343A contains the same name as the object name of the management object table 300 corresponding to this another dependent component.

Next, explanation will be given on specific contents of the dependency relationship table 340 shown in FIG. 5 as an example.

The row 341B indicates that the volume 282A is dependent on the storage server 271A. That is, when a failure occurs in the storage server 271A, a failure also occurs in the volume 282A. The object name 342B contains the object name "282A" corresponding to the volume 282A and the dependency destination object name 343B contains the object name "271A" corresponding to the storage server 271A.

The row 341C indicates that the volume 282A' is dependent on the storage server 271A. That is, if a failure occurs in the storage server 271A, a failure also occurs in the volume 282A'. The object name 342C contains the object name "282A'" corresponding to the volume 282A', and the dependency destination object name 343C contains the object name "271A" corresponding to the storage server 271A.

The row 341D indicates that the job program 262A is dependent on the volume 282A. That is, if a failure occurs in the volume 282A, a failure also occurs in the job program 262A. The object name 342D contains the object name "262A" corresponding to the job program 262A, and the dependency destination object name 343D contains the object name "282A" corresponding to the volume 282A.

The row 341E indicates that the job program 262B is dependent on the volume 282A. That is, if a failure occurs in the volume 282A, a failure also occurs in the job program 262B. The object name 342E contains the object name "262B" corresponding to the job program 262B, and the dependency destination object name 343E contains the object name "282A" corresponding to the volume 282A.

The row 341F indicates that the job program 262B is dependent on the volume 282A'. That is, if a failure occurs in the volume 282A', a failure also occurs in the job program 262B. The object name 342F contains the object name "262B" corresponding to the job program 262B, and the dependency destination object name 343F contains the object name "282A'" corresponding to the volume 282A'.

It should be noted that the contents of this dependency relationship table 320 are input by the user of the information processing system 200.

Alternatively, a system management agent 261A, 261B or a system management agent 271A, 271B may transmit their dependency relationship information as a message to the system management server 132 so that the system management server 132 can create the contents according to the message received.

FIG. 6 explains an example of the policy rule table 360.

The policy rule table 360 is a table structure consisting of at least one "row" as an entry. As has been described above, the policy rule is a description of a series of the system management operations to be executed when an event has occurred for the component of the information processing system 200. One "row" of the policy rule table 300 has the structure shown in 361A and corresponds to one particular operation among a series of operations defined in the policy rule. The object name 362A contains a name of a component corresponding to the policy rule correlated to the row. The object name 362A contains the same name as the object name of the management object table 300 corresponding to the component. The event name 363A contains the event name correlated to the policy rule corresponding to the row. A serial number 364A contains a serial number of the operation among system management operations. The operation object name 365A contains the component for which the system management operation of the row is executed. The operation object name 365A contains the same name as the object name of the management object table corresponding to the component. It should be noted that the operation object name 365A may be empty or contains "the dependency source".

When the operation object 354A is empty, the system management operation for the row is executed for the user of the information processing system 200. For example, when the "notification" system management operation is executed for the user of the information processing system 200, the operation object name 354A is made empty. As an example of notification executed to the user of the information processing system 200 by the policy rule, there is a case that the policy management computer 211 transmits an electronic mail to the user of the information processing system 200.

When the operation object name 365A is "the dependency source", the message of the event corresponding to the content of the operation name 366A of the row is transmitted to all the components having a dependency relationship with the corresponding component. The components having a dependency relationship are stored in the dependency relationship table 340. The policy manager 112 transmits a system information access request message to the system management server 132. The system management server 132 which has received the message calls the data processing section 135, searches the dependency relationship table 340, acquires all the components having a dependency relationship, and returns them.

The operation name 366A contains a name of the system management operation corresponding to the row. The argument 367A contains additional information other than the operation name when necessary.

Next, explanation will be given on a specific content of the policy rule table 360 shown in FIG. 6.

The row 361B means that the system management operation of "replacement" is executed to the storage server 271A as the first operation of the series of the system management operations when the storage server 271A has failed and stopped. The object name 362B contains "271A", the event name 363B contains "down" meaning stop by failure, the serial number 364B contains "1" indicating the first operation to be executed among the series of system management operations, the operation object name 365B contains "271A", the operation name 366B contains "alteration", and the argument 367B contains an empty character string.

The row 361C means that an event having an event name "alteration" is transmitted to all the components dependent to the storage server 271A as a second operation of the series of the system management operations when the storage server 271A has failed and stopped. The object name 362C contains "271A", the event name 363C contains "down" meaning stop by failure, the serial number 364C contains "2" indicating the second operation to be executed among the series of system management operations, the operation object name 365C contains "the dependency source", the operation name 366C contains "alteration", and the argument 367C contains an empty character string.

The row 361D means that an event having an event name "storage alteration" is transmitted to all the components using the volume 282A when the volume 282A is replaced by the backed up volume. The object name 362D contains "282A", the event name 363D contains "alteration" meaning replacement of the volume, the serial number 364D contains "1" indicating the first operation to be executed among the series of system management operations, the operation object name 365D contains "the dependency source", the operation name 366D contains "storage alteration", and the argument 367D contains an empty character string.

The row 361E means that an event having an event name "storage alteration" is transmitted to all the components using the volume 282A' when the volume 282A' is replaced by the backed up volume. The object name 362E contains "282A'", the event name 363E contains "alteration" meaning replacement of the volume, the serial number 364E contains "1" indicating the first operation to be executed among the series of system management operations, the operation object name 365E contains "the dependency source", the operation name 366E contains "storage alteration", and the argument 367E contains an empty character string.

The row 361F means that a job program 262A is re-started when the volume used by the job program 262A is replaced, i.e., an event of "storage alteration" has occurred. The object name 362F contains "262A", the event name 363F contains "storage alteration", the serial number 364F contains "1" indicating the first operation to be executed among the series of system management operations, the operation object name 365F contains "262A", the operation name 366F contains "re-start", and the argument 367F contains an empty character string.

The row 361G means that a job program 262B is re-started when the volume used by the job program 262B is replaced, i.e., an event of "storage alteration" has occurred. The object name 362G contains "262B", the event name 363G contains "storage alteration", the serial number 364G contains "1" indicating the first operation to be executed among the series of system management operations, the operation object name 365G contains "262B", the operation name 366G contains "re-start", and the argument 367G contains an empty character string.

The row 361H means that a job program 262B is stopped as the first operation to be executed among the series of system management operations when the volume used by the job program 262B has stopped by failure, i.e., an event of "storage down" has occurred. The object name 362H contains "262B", the event name 363H contains "storage down", the serial number 364H contains "1" indicating the first operation to be executed among the series of system management operations, the operation object name 365H contains "262B", the operation name 366H contains "stop", and the argument 367H contains an empty character string.

The row 361I means that a message "down has occurred" is notified to a user of the information processing system 200 as the second operation to be executed among the system management operations when the volume used by the job program 262B has stopped by failure, i.e., an event of "storage down" has occurred. The object name 362I contains "262B", the event name 363I contains "storage down", the serial number 364I contains "2" indicating the second operation to be executed among the series of system management operations, the operation object name 365I contains an empty character string meaning that notification is executed to the user of the information processing system 200, the operation name 366I contains "notification", and the argument 367I contains a character string "down has occurred".

By storing the contents as shown in FIG. 6 in the policy rule table 360, it is possible to apply the policy rule to the information processing system 200.

Hereinafter, explanation will be given on application of the policy rule when the storage server 271A has stopped by failure.

The system management agent 272A of the storage server 271A detects a failure and transmits an event message "down" to the system management server 132. The message contains the event name "down" and the object name "271A" of the storage server 271A. The system management server 132 which has received the message calls the event processing section 133 and transfers the message to the policy manager 112. The policy manager 112 which has received the message searches the policy rule table 360 by using the event name and the object name contained in the message and acquires all the rows where the object name and the event name are both matched. Here, the row 361B and the row 361C in FIG. 6 having the object name "271A" and the event name "down" are acquired.

Next, the policy manager 112 execute the system management operations (or event transmission to the dependency source or notification to the user of the information processing system 200) described in the rows acquired, in the order of the serial number of the rows acquired. The system management operations are executed by transmitting a system management operation request message to the system management server 132. The system management operation request message contains the object name corresponding to the component subjected to the system management operation and the system management operation name, and the argument. For these information the operation object name, the operation name, and the argument of the rows acquired are used. Here, firstly, a message having the object name "271A", the operation name "alteration", the argument which is empty is transmitted to the system management server 132.

The system management server 132 which has received the message calls the operation processing section 134, references the operation management table 320, searches the row having the object name "271A" and the operation name "alteration", acquires the row 321B, references the agent address of the row 321B, and transmits the message to the system management agent 272B. The system management agent 272B which has received the message calls the controller 272B and performs such processing that the volumes 282B, 282B' of the storage device 281 can be used instead of the volumes 282A, 282A'. It should be noted that in the volume 282B, the content of volume 282A is backed up but the volume 272B' only provides a storage area instead of the volume 282A' and no content is backed up.

It should be noted that the present embodiment is not limited to the contents shown in the aforementioned tables (management objet table 300, operation management table 320, dependency relationship table 340, policy rule table 360) and may contain other than the contents depicted. When the information processing system components different from the contents of FIG. 2, what is necessary is only to modify the contents of each table and there is no need of modification of structure of each table.

FIG. 7 explains an example of the test case list 380. The test case list 380 is a list containing an event which may be caused for each component. The test case list 380 is used for generating a test item for testing the policy rule by the test tool 161.

The test case list which is a list of events is stored in the storage device 171, thereby by constituting the test case storage section.

The test case list 380 is a table structure consisting of at least one "row" as an entry. One row of the test case list 370 has a structure shown in 381A and corresponds to a series of events which may occur for a component. The object type 382A contains the same name as the object type of the row of the management object table 300 corresponding to the component. The dependency destination object type 383A indicates that the event may occur only when there is a dependency relationship between the component of the type described in the object type 382A and the component of the type described in the dependency destination object type 383A.

For example, when a job program is communicating by using a network, that is when there is a dependency relationship with the network, an event of "a communication error" may occur in the job program. Otherwise, there is no possibility that the event of "communication error" may occur. In the former case, "network" is stored in the dependency destination object type and otherwise, the dependency destination object type is an empty character string.

The case number 384A stores the number for identifying the set of the series of events which may occur. The serial number 385A contains the order of the occurrence of the series of events in numbers. The event name 386A contains the event name of the event corresponding to the row. The distribution destination flag 387A is stored only when the dependency destination object type 383A is not an empty character string. For example, when the distribution destination flag 387A is "1", this indicates that the event corresponding to the row 381A may occur in the component ("network" in the aforementioned example) of the dependency destination. Otherwise, the event may occur in the component corresponding to the object type 382A.

Next, referring to FIG. 7, explanation will be given on an example of the contents of the test case list 380.

The row 381B indicates that in the component of the type of volume (such as volume 282A (FIG. 2)), an event of "replacement" indicating replacement with another volume may occur. Accordingly, the object type 382B stores "volume" and this event may occur even if the volume does not depend on other component. Accordingly, the dependency destination object type 383B contains an empty character string. Moreover, the case number 384B contains "1" indicating the first group of the series of events. The serial number 385B contains "1" indicating the first event of the series of events. The event name 386B contains "replacement" indicating stop by failure. The distribution destination flag 387B is an empty character string since it is not used in the row 381B.

The row 381C indicates that in the component of the type of network (such as network 205), an event of "down" indicating stop by failure may occur. Accordingly, the object type 382C stores "network". Since this event may occur even if the network does not depend on other component, the dependency destination object type 383C contains an empty character string. Moreover, the case number 384C contains "1" indicating the first group of the series of events. The serial number 385C contains "1" indicating the first event of the series of events. The event name 386C contains "down" indicating stop by failure. The distribution destination flag 387C is an empty character string since it is not used in the row 381C.

The row 381D indicates that in the component of the type of storage server (such as network 271A), an event of "down" indicating stop by failure may occur. Accordingly, the object type 382D stores "storage server". Since this event may occur even if the storage server does not depend on other component, the dependency destination object type 383D contains an empty character string. Moreover, the case number 384D contains "1" indicating the first group of the series of events. The serial number 385D contains "1" indicating the first event of the series of events. The event name 386D contains "down" indicating stop by failure. The distribution destination flag 387D is an empty character string since it is not used in the row 381D.

It should be noted that the contents of the test case list 380 need not be only the object type information contained in the configuration information on the information processing system 200. In other words, the contents of the test case list 380 of the present embodiment is has no relationship with the configuration information on the information processing system 200 except for the object type. Accordingly, when the test case list 380 contains a row corresponding to the object type contained in the information system 200 as a test object, even when a test case list generated for a different information processing system can be used as it is. The same applied for the policy rule table 360. When the test case list 380 contains a row corresponding to the event name stored in the policy table 360, even if the policy rule of the test object is different from the content of the policy rule table 360 or even if the test case list is generated for a different information processing system, it can be used as it is. Consequently, there is no need of correcting the test case list 380 for each of the information processing systems or each time the policy rule is modified.

The contents of the test case list 380 may be input one by one by the user of the information processing system 200 or the user of the information processing system may copy to the test case list 380 what is created by the user not knowing the configuration information on the information processing system 200 or the contents of the policy rule applied. As an example of the latter, a vender of the storage server 271A provides a test case relating to the storage server 271A and the user of the information processing system 200 adds the provided test case to the test case list 380. Thus, the test case list 380 is provided by the vender and the user of the component and accumulated as knowledge base.

Next, explanation will be given on a test procedure of the policy rule in the test system 100.

As a pre-processing for executing the policy rule test, the test system 100 should be made a component equivalent to the information processing system 200. The user of the information processing system 200 copies the contents of the components of the information processing system, i.e., the management object table 300, the operation management table 320, and the dependency relationship table 340 into the management object table 300 of the test system 100, the operation management table 320 of the test system 100, and the dependency relationship table 340. Similarly, the contents of the policy rule table 360 of the information processing system 200 is copied to the contents of the policy rule table 360 of the test system 100.

Next, the user of the information processing system 200 modifies all the agent addresses of the operation management table 320 of the test system 100 to the addresses (computer address and port number) of the operation reception section 164 of the test tool 161. Thus, an operation request executed by the policy rule is executed with the test tool 161 as the destination and the test tool 161 can receive all the results of test executed.

When this pre-processing is complete, the user of the information processing system 200 calls the test tool 161 in the test system 100 and starts test of the policy rule. Since this preprocessing can be performed while the information processing system 200 is operating, it is possible to execute the test without stopping the job performed in the information processing system 200.

It should be noted that when performing the test on the configuration of the information processing system itself without using the test system 100, the job execution computer 251 and the storage server 271 are separated from the network 201 and the test management computer 151 is connected instead. Moreover, all the agent addresses of the operation management table 320 are modified to the addresses of the operation reception section 164 of the test tool 161.

When the test of the policy rule is started, firstly, the called test tool 161 calls the test item generation section 162. The test item generation section 162 references the management object table 300, the operation management table 320, and the test case list 380, generates a test item, and stores it in the test item 400.

Figure 8:
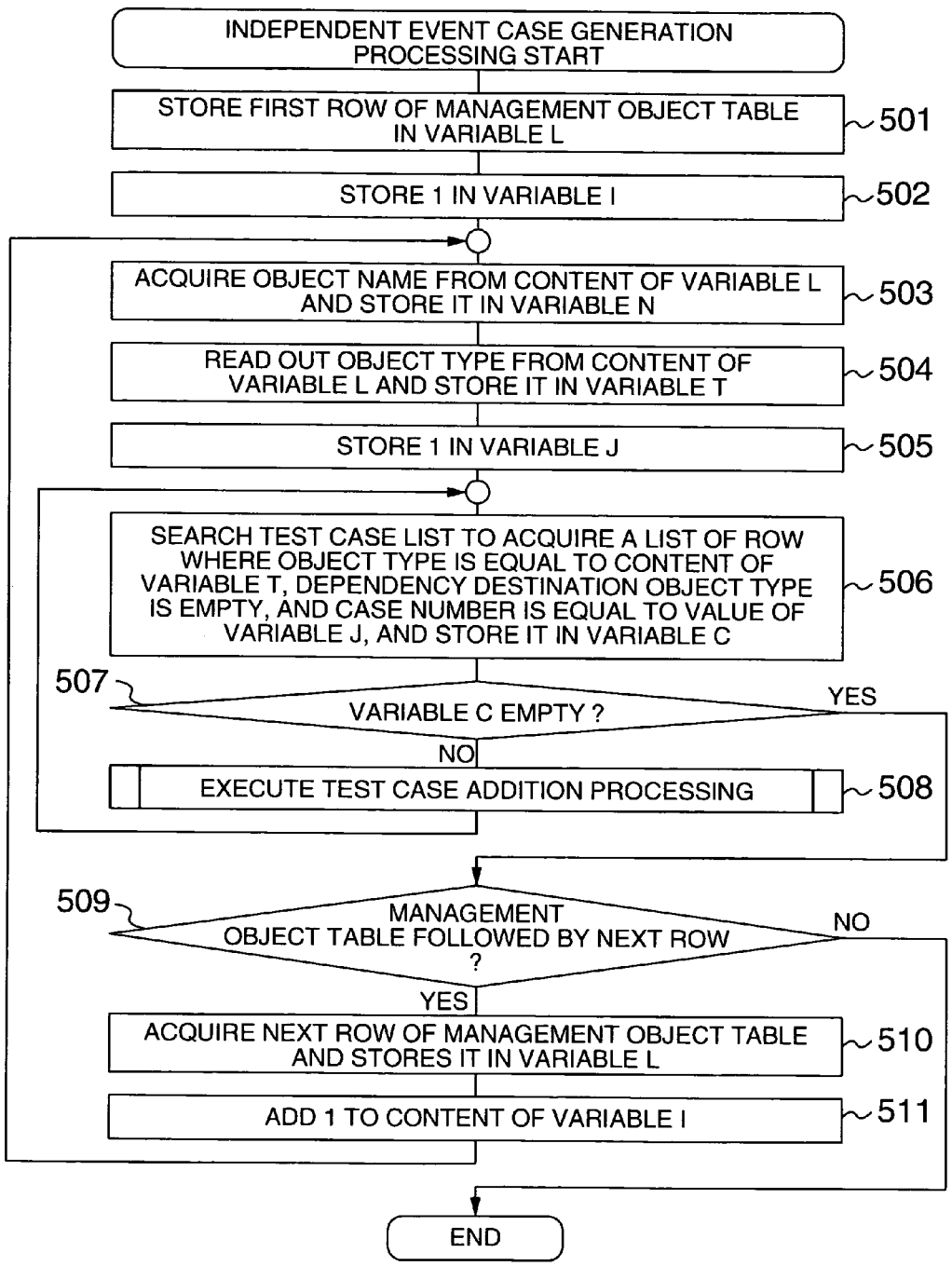
FIG. 8 is a flowchart indicating the content of an independent event case generation processing.

FIG. 8 is a flowchart indicating the independent event case generation processing executed by the test item generation section 162. "The independent event" means an event which can be generated not depending on other components and an event whose dependency destination object type 383A is empty in the test case list 380.

It should be noted that when referencing the management object table 300 and the operation management table 320 while executing the test item generation section 162, an access request message in the configuration information is transmitted to the system management server 132. The system management server 132 which has received the message calls the data processing section 135, accesses configuration information according to the content of the message, and returns the result.

Firstly, the first row of the management object table 300 is acquired and stored in a variable L (Step 501). It should be noted that the variable L has a structure identical to one row of the management object table 300. Next, in order to initialize the variable I used as a repetition counter, 1 is stored in the variable I (Step 502). Next, an object name is acquired from the content of the variable L and stored in the variable N (Step 503). Moreover, an object type is acquired from the variable L and stored in the variable T (Step 504). Next, in order to initialize the variable J used as an internal repetition counter, 1 is stored in the variable J (Step 505).

Next, the test item generation section 162 searches the test case list 380 to acquire a row matched with the search condition and stores it in the variable C (Step 506). The search condition is that the object type is identical to the content of the variable T, the dependency destination object type is an empty character string, and the case number is identical to the content of the variable J which is a counter. After the search is executed, it is judged whether the variable C is empty (Step 507). When the content of the variable C is judged to be empty, control is passed to Step 509, where the same processing is repeated for the next row of the management object table 300. When the content of the variable C is judged to be not empty, a test case addition processing for adding a test case to the test item 400 is performed by using the variable I (counter), the variable N (object name), and the variable C (test case list) (Step 508). The test case addition processing will be detailed later with reference to FIG. 10.

When the test case addition processing is complete, control is returned to Step 506 to search the test case list 380 having a case number equal to variable J (1 is added in the test case addition processing) and repeat Step 507 and Step 508.

In Step 507, if the content of variable C is judged to be empty, that is, if no row is matched with the search condition in the search of Step 506, then it is judged whether the next row is present in the management object table 300 (Step 509). If it is judged that the next row is present, the next row of the management object table 300 is stored in the variable L (Step 510), 1 is added to the content of the variable I which is a counter (Step 511), and the processing of Step 503 and the following is repeated.

In Step 509, if it is judged that the next row of the management object table 300 is absent, that is, if it is judged that all the contents of the management object table 300 have been referenced, the independent event case generation processing is terminated.

As a result of the independent event case generation processing, independent events which may occur for all the components of the information processing system 200 (all the components stored in each row of the management object table 300) are stored in the test item 400.

After the independent event case generation processing is complete, the test item generation section 162 executes a composite event case generation processing. This is because although the procedure of the composite event case generation processing is identical to that of the independent event case generation processing, the components are dependent on one another and a case of simultaneous occurrence of events (composite event) is added to the test item 400. For example, when the event of "down" has occurred in the network and the event of "communication error" occurs in a job program, this is a composite event.

Figure 9:
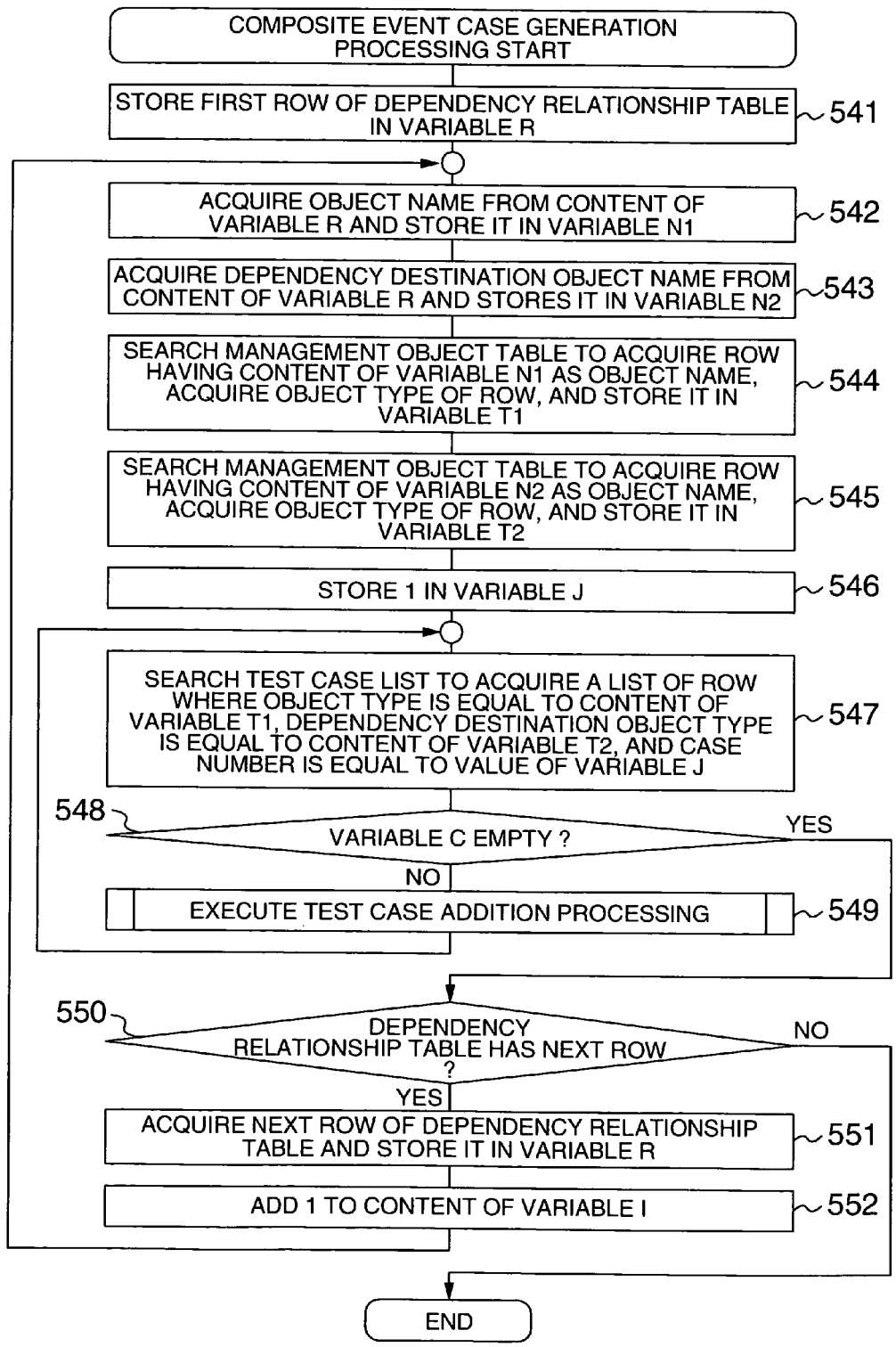
FIG. 9 is a flowchart indicating the content of a composite event case generation processing.

FIG. 9 is a flowchart showing a composite event case generation processing.

After the independent event case generation processing, the test item generation section 162 executes the composite event case generation processing. For this, the variable value (variable I) after the execution of the independent event case generation processing is taken over to the composite event case generation processing.

Firstly, the first row of the dependency relationship table 340 is acquired and stored in the variable R (Step 541). It should be noted that the variable R has the same structure as one row of the dependency relationship table 300. Next, an object name is acquired from the contents of the variable R and stored in variable N1 (Step 542). Moreover, a dependency destination object name is acquired from the contents of the variable R and stored in variable N2 (Step 543).

Next, the management object table 300 is searched and an object type is acquired from the row having the object name identical to the contents of the variable N1, i.e., the row corresponding to the component of the dependency source of the dependency relationship, and is stored in variable T1 (Step 544). Moreover, the management object table 300 is searched and an object type is acquired from the row having the object name identical to the contents of the variable N2, i.e., the row corresponding to the component of the dependency destination of the dependency relationship, and is stored in variable T2 (Step 545). Next, in order to initialize the variable J used as an internal repetition counter, 1 is stored in the variable J (Step 546).

Next, the test case list 380 is searched to acquire a list of the rows matched with the search condition and it is stored in variable C (Step 547). The search condition is that the object type identical to the contents of the variable T1, the object type of the dependency destination is identical to the contents of the variable T2, and the case number is identical to the contents of the variable J. By executing Step 547, it is possible to acquire an event which occurs when the dependency relationship is present between the two components for the object names corresponding to the components described in one row of the dependency relationship table 340.

After Step 547, it is judged whether the content of variable C containing the search result is empty, i.e., whether the row is absent in the test case list 380 (Step 548). If the content of the variable C is judged to be empty, control is passed to Step 550 to repeat the processing for the next row in the dependency relationship table. If the content of the variable C is judged to be not empty, the test case generation processing is executed (Step 549). When the text case addition processing is complete, control is returned to Step 547 to repeat search of the test case list 380 having the case number identical to the variable J (1 has been added in the test case addition processing).

In Step 548, if the content of the variable C is judged to be empty, it is judged whether the next row is present in the dependency relationship table (Step 550). If it is judged that the next row is present in the dependency relationship table 340, the next row of the dependency relationship table 340 is acquired and stored in variable R (Step 551) and 1 is added to the content of the variable I which is a counter (Step 552). Control is returned to Step 542.

In Step 550, if it is judged that no next row is present in the dependency relationship table 340, i.e., if it is judged that all the contents of the dependency relationship table have been referenced, the composite event case generation processing is terminated.

Figure 10:
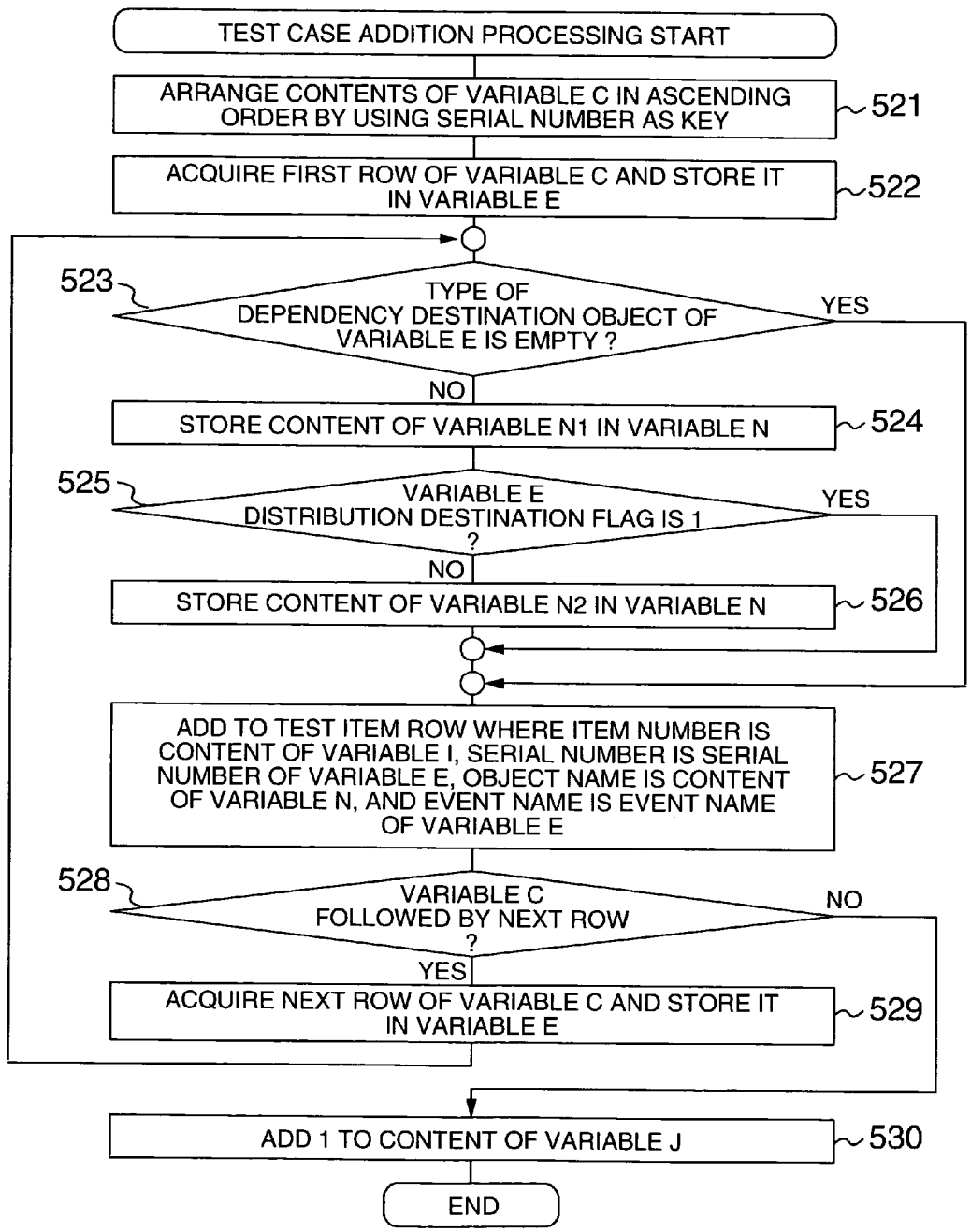
FIG. 10 is a flowchart indicating the content of test case addition processing.

FIG. 10 is a flowchart showing a test case addition processing.

Firstly, the contents of variable C are arranged in the ascending order by using the serial number as a key (Step 521). Next, the first row of the variable C is acquired and stored in variable E (Step 522). It should be noted that the variable E has structure identical to one row of the test case list 380. Next, it is judged whether the dependency destination object type of the variable E is an empty character string (Step 523). If it is judged that the dependency destination object type is empty, i.e., an independent event case (called from the processing of FIG. 8), control is passed to Step 527. If it is judged that the dependency destination object type is not empty, i.e., a composite event case (called from the processing of FIG. 9), control is passed to Step 524.

In Step 524, the value of variable N1 is stored in variable N. Next, the variable N is referenced to judge whether the distribution destination flag is "1" (Step 525). If the distribution destination flag is judged to be other than "1", i.e., if the object is a dependency destination object, the value of variable N2 is stored in variable N and control is passed to Step 527. If the distribution destination flag is judged to be "1", i.e., if the object is a dependency source object, control is passed to Step 527 without executing the processing of Step 526.

Step 527 creates a row in which the item number is the content of the variable I, the serial number is the serial number of the variable E, the object name is the content of the variable N, and the event name is the event name of the variable E. This row is added as a new row of the test item 400 (see FIG. 11).

After the row is added to the test item 400, it is judged whether the next row is present in the variable C arranged by the serial number (Step 528). If the next row is judge to be present in the variable C, the row is acquired and stored in variable E (Step 529). Next, control is returned to Step 523 to repeat the processing of adding a row to the test item 400.

In Step 528, if it is judged that no next row is present in the variable C, 1 is added to the content of the variable J (Step 530), the test case addition processing is terminated, and control is returned to the independent event case generation processing (FIG. 8) or the composite event generation processing (FIG. 9).

FIG. 11 explains one example of the test item 400 generated by the test case addition processing (FIG. 10).

The test item 400 is a table structure consisting of at least one "row" as an entry. One "row" of the test item 400 is a structure shown in 401A and the item number 402A stores a number assigned to each of the test item. The serial number 403A contains the operation number of the series of test items. The object name 404A contains the name of the component corresponding to the test item correlated to the row. The event name 405A contain the event name corresponding to the row.

The row 401B indicates that in volume 282A, "replacement", i.e., replacement by another volume may occur. The item number 402B contains "1", the serial number 403B contains "1", the object name 404B contains the object name "282A" corresponding to the volume 282A, and the event name 405B contains "replacement" meaning stop by failure. It should be noted that the item number 402B and the serial number 403B are used when generating an event for testing the policy rule. The item number is used to identify a series of events generated in the test while the serial number is used for identifying the event number in the series of events. The item number and the serial number are also used in the same way in the other rows.

The row 401C indicates that in volume 282A', "replacement", i.e., replacement by another volume may occur. The item number 402C contains "2" indicating the second test item, the serial number 403C contains "1", the object name 404C contains the object name "282A'" corresponding to the volume 282A', and the event name 405C contains "replacement" meaning stop by failure.

The row 401D indicates that in the network 205, "down", i.e., stop by failure may occur. The item number 402D contains "3" indicating the third test item, the serial number 403D contains "1", the object name 404D contains the object name "205" corresponding to the network 205, and the event name 405D contains "down" meaning stop by failure.

The row 401E indicates that in the storage server 271A, "down", i.e., stop by failure may occur. The item number 402E contains "4" indicating the fourth test item, the serial number 403E contains "1", the object name 404E contains the object name "271A" corresponding to the storage server 271A, and the event name 405E contains "down" meaning stop by failure.

As has been described above, by the independent event case generation processing and the composite event case generation processing, a list of events which may occur in the information processing system 200 is created in the test item 400.

When the event case generation processing is complete in the test item generation section 162, next, the test tool 161 calls the event generation section 163 and executes the event generation processing.

Figure 12:
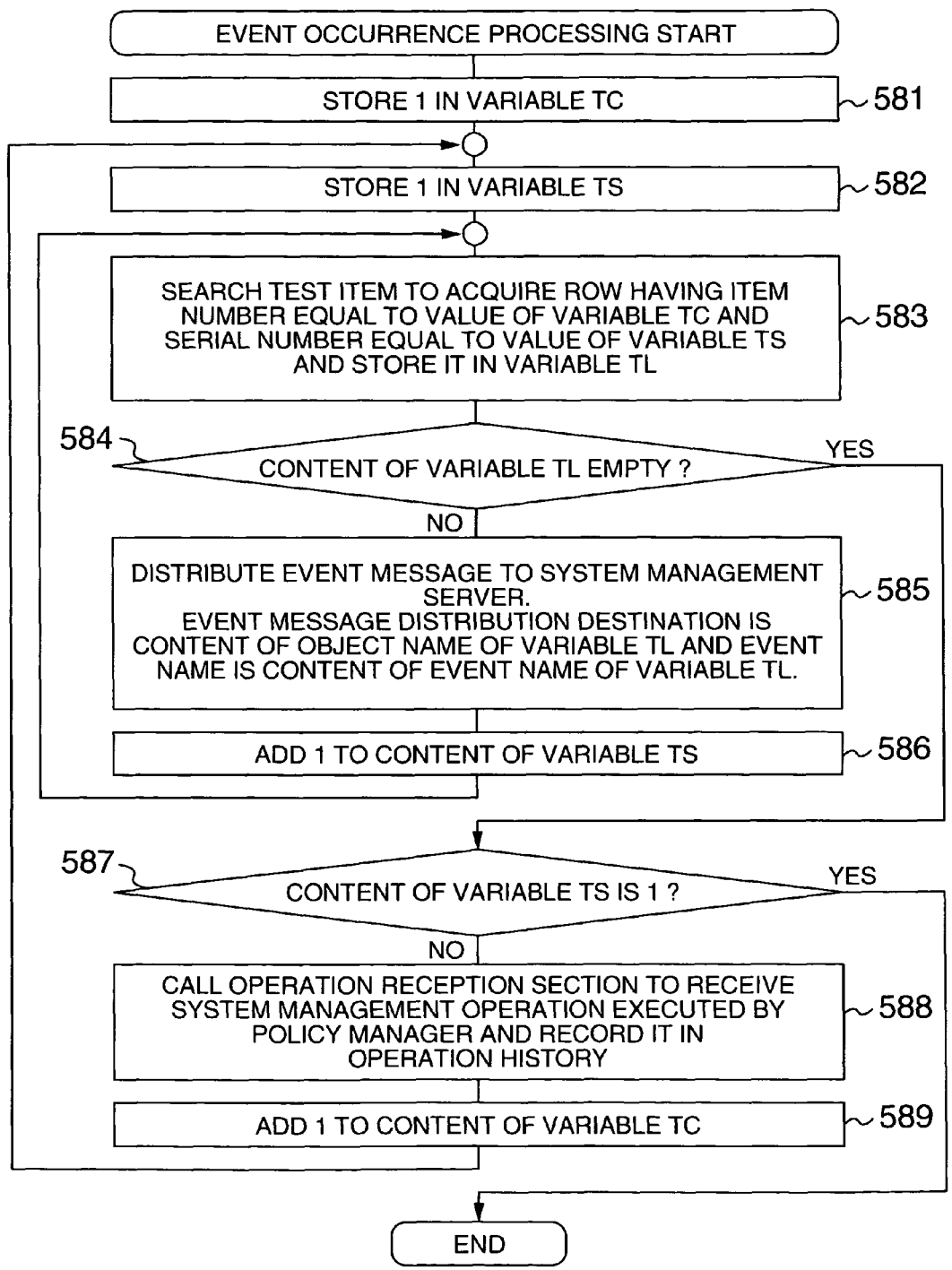
FIG. 12 is a flowchart indicating the content of event generation processing.

FIG. 12 is a flowchart showing the event generation processing.

Firstly, the event generation section 163 stores 1 in the variable TC which is a counter (Step 581). Next, the event generation section stores 1 in the variable TS which is an internal repetition counter (Step 582). Next, the test item 400 is searched to acquire a row whose item number is identical to the value of the variable TC and serial number is identical to the value of the variable TS and it is stored in the variable TL (Step 583). If the content of the variable TL is empty, i.e., if no such row is present, control is passed to Step 587 to repeat the processing for the next row of the test item 400. If the content of the variable TL is judged to be not empty, an event message is transmitted to the system management server 132 (Step 585). In the event message, the object name contains the content of the object of the variable TL and the event name contains the event name of the variable TL.

The system management server 132 which has received the message judges that the event indicated by the event name has occurred in the component indicated by the object name. The system management server 132 acquires a policy rule corresponding to the event and executes a system management operation request according to the policy rule acquired. Here, the agent addresses of the operation management table 320 are all modified to the addresses of the operation reception section 164 of the test tool 161 and the system management operation requests executed by the policy rule are all executed to the destination of the test tool 161.

Next, 1 is added to the content of the variable TS (Step 586) and control is returned to Step 183. If there are events to be transmitted simultaneously, the event messages are successively transmitted by the number of serial numbers searched by the variable TS.

In Step 584, if the content of the variable TL is judged to be empty, i.e., all the events to be transmitted simultaneously have been transmitted to the system management server 132, control is passed to Step 587. In Step 587, it is judged whether the content of the variable TS is 1, i.e., whether one or more events have been transmitted. If the content of the variable TS is judged to be 2 or above, i.e., it is judged that one or more events have been transmitted, the operation reception section 164 is called (Step 588).

In Step 588, the operation reception section 164 receives all the request messages of the system management operations arriving within a predetermined time. The predetermined time is, for example, 5 minutes which is sufficient for the policy manager 112 to transmit messages requesting series of system management operations described in the policy rule to the series of events transmitted to the system management server 132.

Next, the event generation section 163 adds 1 to the content of the variable TC (Step 589) and control is returned to Step 582 to repeat the processing.

In Step 587, if the value of the variable TS is judged to be 1, i.e., only one event is to be transmitted, it is judged that the collection of results for the event which may occur is complete, and the event generation processing is terminated. Here, the operation reception section 164 receives the system management operation request message transmitted from the system management server 132 and adds a row to the operation history 420.

When the aforementioned event generation processing is complete, a series of procedures are executed. That is, a message for all the events which may occur is transmitted to the system management server 132 and then transferred to the policy manager 112. The policy manager 112 transmits a message requesting system management operation according to the policy rule (stored as the policy table 360) applied. The system management server 132 receives the message, references the operation management table 320, and transfers the message to the operation reception section. The operation reception section 164 receives the message and records it on the operation history 420.

FIG. 13 explains an example of the operation history 420.

The operation history 420 has a table structure consisting of at least one row as an entry. One row of the operation history 420 corresponds to a system management operation request message received. The item number 422A contains the content of the variable TC. The operation time 423A contains the time when the message is received. The object name 424A contains the object name corresponding to the component of the operation object contained in the message. The operation name 425A contains the operation name contained in the message. The argument 426A stores an argument contained in the message.

The event generation processing is completed by the series of operations explained above.

Next, the user of the information processing system 200 references the operation history 420 by using the input device 181 and the output device 182. The user can check whether for the policy rule applied to the information processing system 200, expected system management operation has been executed for the event which may occur in the information processing system.

For example, the event corresponding to the item number "1" (row 401B) of the test item 400 (FIG. 11) is processed by the event generation section 163 and as a result, a message requesting re-start of the job program 262A is recorded in the row (row 421B) having the item number "1" of the operation history 420 (FIG. 13). It should be noted that other system management operations are recorded as a row having the item number "1" but they are not depicted. The item number "1" corresponds to an event meaning that the volume 282A is replaced by the volume 282B and this can be judged to be an operation as is expected. The same applied to the row of the item number "2" (row 401C).

Moreover, the event corresponding to the item number "3" (row 401D) of the test item 400 is processed by the event generation section 163 and as a result, the item number "3" is not recorded in the operation history 420. Since the item number "3" corresponds to an event indicating that the network 205 is in the down state, it is judged that this cannot be coped with by the policy rule. From this result, the user of the information processing system 200 prepares a man-power monitoring system and adds a policy rule for again performing a test, thereby performing countermeasures when the network 205 is in the down state.

Moreover, the event corresponding to the item number "4" (row 401E) of the test item 400 is processed by the event generation section 163 and as a result, in the rows having the item number "4" of the operation history 420 (row 421E, row 421F), a system management operation request message requesting re-start of the job program 262B and a system management operation request message requesting stop of the job program 262B are recorded (recording of the other operations are not depicted). Since the item number "4" corresponds to an event indicating that the storage server 271A is in the down state, it is confirmed that when the storage server is in the down state, a system management operation contradicting to the job program 262B is executed. From this result, the user of the information processing system 200 performs countermeasures such as modifying the policy rule or modifying the volume used in the job program 262B so that no contradicted system management operation is executed.

It should be noted that explanation has been given on a case that the operation history is checked by the user of the information processing system 200 but a part or all of the work may be automatically executed by the test management computer 151 or another computer.

Embodiment 2

Description will now be directed to a second embodiment of the present invention.

This embodiment uses the test method of the policy rule described in Embodiment 1. More specifically, a third party different from the user of the information processing system 200 performs the test of the policy rule by using the test method described in the Embodiment 1 and executes a work to check the result as a service for value. Thus, the third party providing the service can have benefit.

It should be noted that according to Embodiment 1, the third party need not execute the test by using the information processing system 200. That is, the third party uses the test system 100 and applies the configuration information and the policy rule of the information processing system 200. By modifying only the configuration information and the policy rule, it is possible to test the policy rule in a plurality of different information processing systems 200 by using the same test system. Thus, the third party can provide an effective test method can have a corresponding benefit.

The fare of the service for value may be a fixed value or a basic fare added by the value proportional to the number of tests. The number of tests may be the number of rows in the test item 400 (FIG. 11) or only the number of rows having different item numbers among the rows of the test item 400. It should be noted that when the fare is a fixed value, the calculation of the fare is simple while the latter has an advantage that the third party can have more benefit by executing more tests. Moreover, it is possible to calculate the fare of the service for value by a method other than this.

Moreover, there is a case that the configuration information and the policy rule of the information processing system 200 is secret information and the user wants the third party to execute the test of the policy rule without disclosing the content to the third party. In this case, encrypted configuration information and policy rule are stored in the storage device. The policy manager 112 and the system management server 132 performs decryption when referencing the encrypted configuration information. As for the configuration information, the information stored in the storage device is decrypted only when an access request message is received from the test tool 161 and access in accordance to the message is executed by the system management server 132. Thus, the third party can execute the test of the policy rule without knowing the content of the encrypted configuration information and the policy rule even if he/she references the content of the storage device.

Embodiment 3

Description will now be directed to a third embodiment of the present invention.

This embodiment uses the test method of the policy rule described in Embodiment 1. More specifically, a third party (an insurance company or the like) different from the information processing system calculates the insurance money for covering the damage caused to the user due to the information processing system 200 by using the method described in Embodiment 1.

The third party references the test result and judges that if the system management operation by the policy rule has been executed correctly and automatically in all (or almost all) the events which may occur, the possibility that the information processing system 200 gives a damage to the user is low. When the damage caused to the user is low, the insurance money is reduced. When the possibility to cause a damage to the user is judged to be high, the insurance money is increased.

Explanation will be given on a specific example of insurance money calculation method. The third party firstly decides a fixed basic insurance money. Next, the third party executes test of the policy rule according to the method described in Embodiment 1 for the information processing system 200 for which the insurance money is to be calculated. As a result of execution of the policy rule test, an operation history 420 (FIG. 13) is obtained. This operation history 420 is compared to the test item 400 (FIG. 11). Each item number of the test item 400 is correlated to the item number of the operation history 420 and the number of those whose item numbers are not matched (hereinafter, referred to as "the number of manual operation items") is calculated.

The sum of the calculated number of manual operation items is added to the basic insurance money. Thus, it is possible to calculate the insurance money to cover the damage caused to the user of the information processing system 200.

This insurance money calculation method has advantages as follows.

That is, the number of manual operation items calculated indicate the events which may occur in the information processing system 200 and the number of events for which the system management operations are not executed automatically as policy rules. These events require manual system management in the information processing system 200 and increase of damage due to an operation mistake and operation delay is expected. Accordingly, in the insurance money calculation method according to embodiment 3, as the number of events requiring manual system management increases, the insurance money covering the damage is calculated higher. Thus, the insurance money increases as the possibility of occurrence of damage increases, thereby calculating the insurance money based on the actual condition.

It should be noted that when the configuration information and the policy rule of the information processing system 200 are secret information and the user does not want disclose them to a third party, the user can encrypt the configuration information and the policy rule in the same way as in the aforementioned embodiment 2.

It should be noted that the present invention can include the following embodiment as an example.

Policy verification method using a first information system consisting of at least one component and a policy describing a series of system management operations to be performed when an event occurs in the first information processing system and verifying the propriety of the policy in the second information processing system from the result of the system management operations automatically executed in the first information processing system, the method comprising:

a first step of acquiring, by the second information processing system, configuration information which is information on the component constituting the first information processing system;

a second step of acquiring, by the second information processing system, the policy of the first information processing system;

a third step of acquiring all events which may occur in the first information processing system from a list of event names stored in advance and the configuration information acquired and generating them as a test item; and a fourth step of executing the generated test item and verifying the propriety of the policy according to a result of the system management operations executed by the acquired policy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A policy verification method for verifying a system management policy, said system management policy being used in an information processing system including one or more system components, and describing system management operations to be performed to automatically execute system management operations on said system components, each one of said system management operations identifying a corresponding system component to be requested to perform an operation responsive to an event received from one of said system components, the method for verifying whether the system management operations to be automatically requested by said system management policy are correct or not, said information processing system including:

a test tool;
a system management server holding system component information for each said one or more system components constituting said information processing system, said system component information indicating identification information of identifying said system component, and address information to access said system component, said system component information being used for sending the system management operation to the identified system component; and
a policy manager storing system management policy,
wherein said method comprising said test tool, in testing, effecting operations of:
modifying said address information of said system component information for all system components, stored in said system management server, to direct-address information which redirects delivery to said test tool as a substitute destination in order for said test tool to be able to receive a result of the system management operations during testing, instead of said corresponding system component;
acquiring configuration information of the information processing system from said system management server;
acquiring all events which may occur in the information processing system from a list of event names stored in advance and the acquired configuration information;
generating a test item specifying a test event, according to one or more acquired events;
transmitting the test event specified by the generated test item to said policy manager and/or said system management server; and
recording a result of the system management operations which is requested by said policy manager and said system management server responsive to the test event specified by the generated test item, but which is redirected back to said test tool via the redirect-address information stored in said system management server.

2. An information processing system verifying a system management policy and including one or more system components, said system management policy describing system management operations to be performed to automatically execute system management operations on said system components, each one of said system management operations identifying a corresponding system component to be requested to perform an operation responsive to an event received from one of said system components, the information processing system verifying whether the system management operations to be automatically requested by said system management policy are correct or not, said information processing system including:

a test management computer executing a test tool;
a system management computer executing a system management server holding system component information for each said one or more system components constituting said information processing system, said system component information indicating identification information identifying said system component, and address information to access said system component, said system component information being used for sending the system management operation to the identified system component; and
a policy manager storing system management policy,
wherein said test tool is configured to effect, in testing, operations of:
modifying said address information of said system component information for all system components, stored in said system management server, to redirect-address information which redirects delivery to said test tool as a substitute destination in order for said test tool to be able to receive a result of the system management operations during testing, instead of said corresponding system component;
acquiring configuration information of the information processing system from said system management server;
acquiring all events which may occur in the information processing system from a list of event names stored in advance and the acquired configuration information;
generating a test item specifying a test event, according to one or more acquired events;
transmitting the test event specified by the generated test item to said policy manager and/or said system management server; and
recording a result of the system management operations which is requested by said policy manager and said system management server responsive to the test event specified by the generated test item, but which is redirected back to said test tool via the redirect-address information stored in said system management server.

3. A non-transitory computer-readable medium embodying a policy verification method for verifying a system management policy, said system management policy being used in an information processing system including one or more system components, and describing system management operations to be performed to automatically execute system management operations on said system components, each one of said system management operations identifying a corresponding system component to be requested to perform an operation responsive to an event received from one of said system components, the method for verifying whether the system management operations to be automatically requested by said system management policy are correct or not, said information processing system including:

a test tool;
a system management server holding system component information for each said one or more system components constituting said information processing system, said system component information indicating identification information identifying said system component, and address information to access said system component, said system component information being used for sending the system management operation to the identified system component; and
a policy manager storing system management policy,
wherein said method comprising said test tool, in testing, effecting operations of:

modifying said address information of said system component information for all system components, stored in said system management server, to redirect-address information which redirects delivery to said test tool as a substitute destination in order for said test tool to be able to receive a result of the system management operations during testing, instead of said corresponding system component;

acquiring configuration information of the information processing system from said system management server;

acquiring all events which may occur in the information processing system from a list of event names stored in advance and the acquired configuration information;

generating a test item specifying a test event, according to one or more acquired events;

transmitting the test event specified by the generated test item to said policy manager and/or said system management server; and recording a result of the system management operations which is requested by said policy manager and said system management server responsive to the test event specified by the generated test item, but which is redirected back to said test tool via the redirect-address information stored in said system management server.

* * * * *